United States Patent
Ortel

(10) Patent No.: US 9,477,697 B2
(45) Date of Patent: Oct. 25, 2016

(54) GENERATING DATABASE SCHEMAS FOR MULTIPLE TYPES OF DATABASES

(75) Inventor: Jeffrey R. Ortel, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 526 days.

(21) Appl. No.: 12/828,001

(22) Filed: Jun. 30, 2010

(65) Prior Publication Data

US 2012/0005241 A1 Jan. 5, 2012

(51) Int. Cl.
*G06F 7/00* (2006.01)
*G06F 17/30* (2006.01)

(52) U.S. Cl.
CPC ... *G06F 17/30294* (2013.01); *G06F 17/30292* (2013.01); *G06F 17/30569* (2013.01)

(58) Field of Classification Search
None
See application file for complete search history.

(56) References Cited

U.S. PATENT DOCUMENTS

| | | | |
|---|---|---|---|
| 6,549,901 B1 * | 4/2003 | Loaiza et al. | 707/999.007 |
| 7,716,170 B2 * | 5/2010 | Farag | 707/694 |
| 8,010,899 B2 * | 8/2011 | Choi et al. | 715/746 |
| 8,060,534 B1 * | 11/2011 | Ansari et al. | 707/794 |
| 2002/0194244 A1 * | 12/2002 | Raventos | 709/101 |
| 2004/0088404 A1 * | 5/2004 | Aggarwal | 709/224 |
| 2006/0129605 A1 * | 6/2006 | Doshi | 707/104.1 |
| 2006/0136452 A1 * | 6/2006 | Lim | G06F 17/30292 |
| 2007/0288172 A1 * | 12/2007 | Aronow et al. | 707/6 |
| 2010/0036813 A1 * | 2/2010 | Cameron et al. | 707/3 |
| 2010/0251242 A1 * | 9/2010 | Sivasubramanian et al. | 709/203 |

OTHER PUBLICATIONS

Altova, "Database Schema Comparison Tool," as downloaded from http://www.altova.com/databasespy/database-structure-compare-tool.html, on Jun. 30, 2010.

* cited by examiner

*Primary Examiner* — Jau-Shya Meng
(74) *Attorney, Agent, or Firm* — Lowenstein Sandler LLP

(57) ABSTRACT

A computer system receives data defining a database schema in a common representation, creates a data model based on the input file, identifies one or more database types of a plurality of database types for which a schema is to be generated, and causes a database specific schema file to be generated for each of the one or more database types based on the data model.

18 Claims, 5 Drawing Sheets

GENERATING DATABASE SCHEMAS FOR MULTIPLE TYPES OF DATABASES

TECHNICAL FIELD

Embodiments of the present invention relate to generating schemas for relational databases. Specifically, embodiments of the invention relate to a method and system for automatically generating database specific schemas for multiple database types.

BACKGROUND

Software applications that use relational databases for storage are often required to support multiple database types. However, each database type has a unique structure and contains features that may be inapplicable to other database types. For example, an Oracle® database supports data types (e.g., BIGINT, SMALLINT) not supported by PostGres, which classifies integers by the desired number of digits. Furthermore, Oracle® and PostGres have different tuning parameters (e.g., logging parameters, table spaces) as well as a different constraint syntax. Differences such as these are apparent between many of the commonly used databases. Therefore, a software developer using relational databases for storage cannot create a single database schema that will be supported by every database type. Because of the differences in structure and function, each database type uses a different data dictionary language (ddl), requiring a separate schema to define the desired database structure for that database type. Accordingly, software developers must maintain separate copies of their schema, each copy with its own database specific syntax. Any changes made to the schema will have to be made on each copy using that database specific syntax. This can be time consuming and inefficient.

BRIEF DESCRIPTION OF THE DRAWINGS

Embodiments of the present invention are illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of a method and system for generating database specific versions of a schema are described herein. In one embodiment, data defining a database schema in a common representation is received. A data model of the schema is then created using the common representation of the schema. One or more database types for which to generate a schema are identified, and a database specific schema is generated for each of those types based on the data model. In one embodiment, the database specific schemas for the selected database types are generated by plugins associated with those database types.

A software developer is therefore only required to create and maintain one version of a schema during software development. Once the schema has been finalized, schemas specific to desired database types can be generated automatically.

Figure 1:
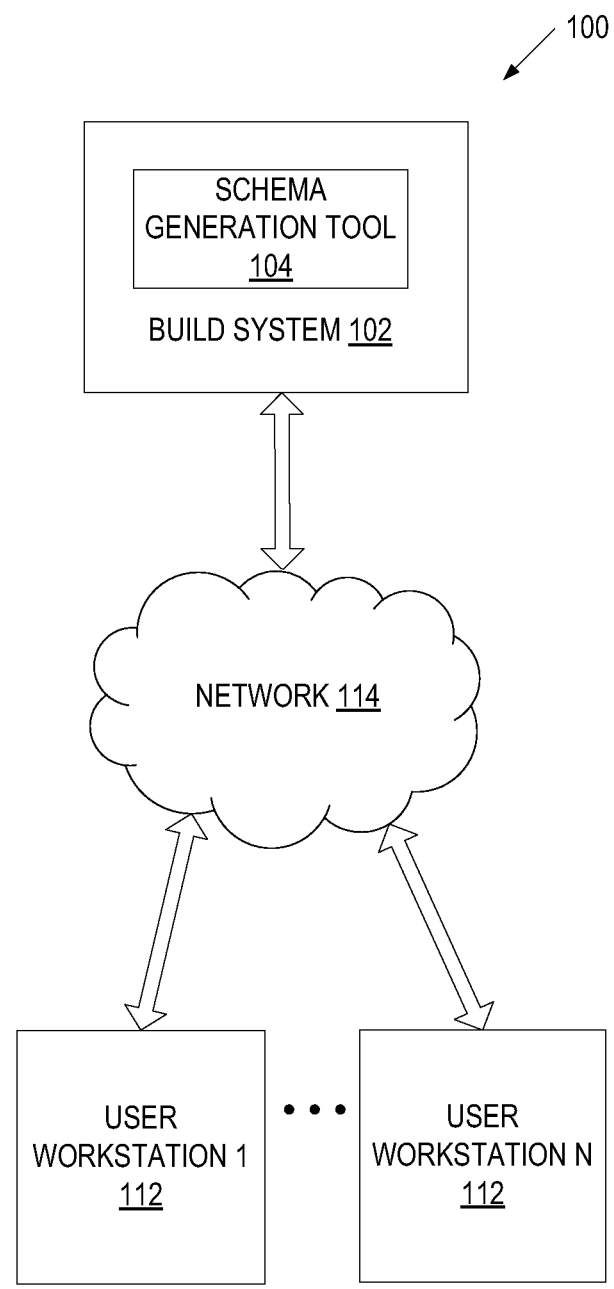
FIG. 1 illustrates an exemplary network architecture in which embodiments of the invention may operate.

FIG. 1 illustrates an exemplary network architecture 100 in which embodiments of the invention may operate. The architecture 100 includes a build system 102 coupled to multiple user workstations 112 via a network 114. A user workstation 112 may be a client computing system such as a personal computer, a laptop, a PDA, a mobile phone, etc. The build system 102 may be hosted by one or more servers such as server computers, gateway computers, etc. The network 114 may be a public network (e.g., Internet) or a private network (e.g., a local area network (LAN)).

In one embodiment, the build system 102 includes a schema generation tool 104. As will be discussed in more detail in conjunction with FIGS. 2 and 3, the schema generation tool 104 can automatically generate multiple database specific versions of a schema from a single common schema.

Figure 2:
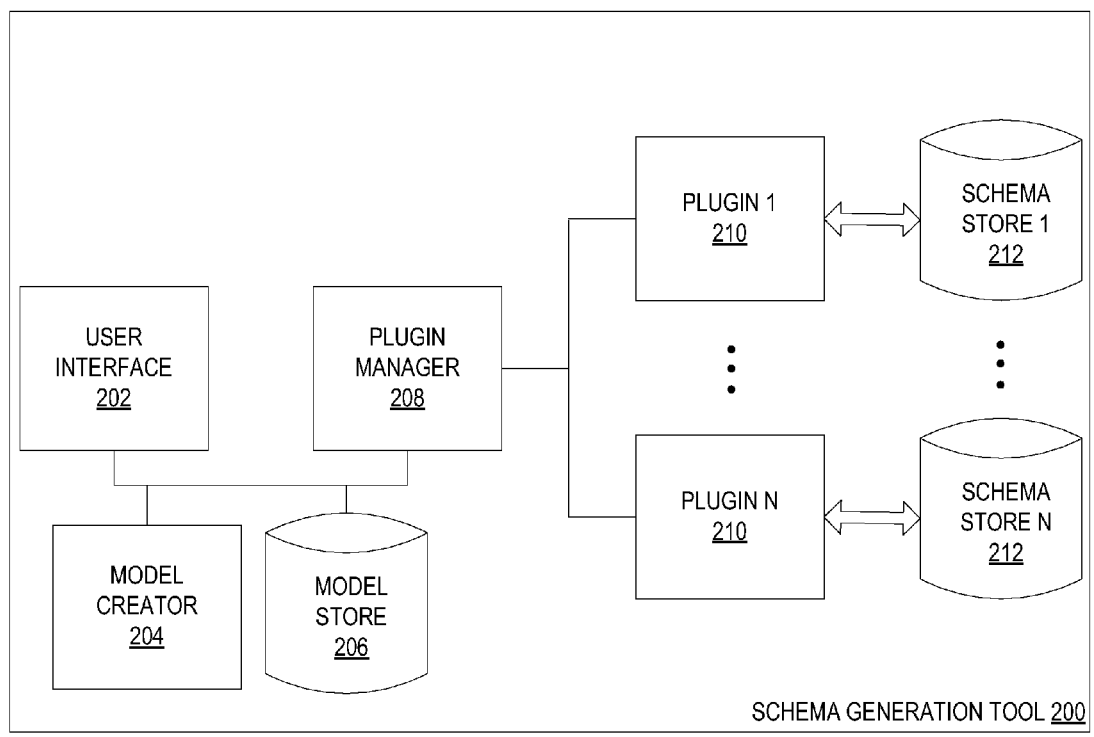
FIG. 2 is a block diagram of one embodiment of a schema generation tool.

FIG. 2 is a block diagram of one embodiment of a schema generation tool 200. The schema generation tool 200 may be the schema generation tool 104 of FIG. 1. The schema generation tool 200 may include a user interface 202, a model creator 204, a model store 206, a plugin manager 208, plugins 210, and schema stores 212.

The user interface 202 receives data defining a database schema in a representation that is common to multiple database types. In one embodiment, the received data is a schema written in a common data dictionary language (ddl). The common ddl may be a superset of terminology used in the Oracle® and PostGres database products. The data defining the database schema may be a URL, a file name or any other identifier of a document containing the database schema. The user interface may also receive data that identifies the database types for which a database specific schema is to be generated. The user interface 202 may include a graphical user interface (GUI) that receives input of a user or a command line user interface that receives input of a user or another program.

Model creator 204 creates an internal data model based on the data received by user interface 202 and stores it in a model store 206. In one embodiment, the model is created based on a received schema file written in a common ddl. The model may be created by model creator 204 by parsing the received schema file as it consumes the received file.

Plugin manager 208 manages plugins 210. In one embodiment, plugin manager 208 determines which of the plugins 210 to invoke based on the data received by user interface 202 indicating which database types to generate a schema for. Each of the plugins 210 may be associated with a particular database type and may generate a schema specific to that database type when invoked by plugin manager 208. The schemas generated by each of the plugins 208 are then stored in the corresponding schema store 210.

Plugins 210 may each be associated with a corresponding database product. For example, one of the plugins 208 may be associated with a PostGres database product. When data is received by user interface 202 indicating that a schema for a PostGres database is to be generated, plugin manager 208 invokes the plugin associated with the PostGres database. The associated plugin then renders the internal data model stored in model store 206 into a schema file specific to the PostGres database product. Alternatively, some of the plugins 210 may be associated with different versions of the same database product. For example, one plugin 210 may be associated with one version of the PostGres database product, a second plugin 210 may be associated with an earlier version of the PostGres product, and a third plugin 210 may be associated with an Oracle® database product.

Plugin manager 208 may also manage the addition of new plugins 210. When support is desired for an additional database type, a new plugin 210 may be added to schema generation tool 200. The new plugin 210 may be associated with the additional database type. The additional database type may be an additional database product that is not yet supported by any of the existing plugins 210. Alternatively, it may be a new version of a database product that is already supported by an existing plugin. When the new plugin 210 is added, plugin manager 208 allows the new plugin to be invoked upon receiving data that a schema specific to the additional database type is to be generated.

When invoked by plugin manager 208, plugins 210 may generate a schema for their corresponding database type based on the internal data model of the received schema text created by model creator 204. Each invoked plugin 210 may access the created data model from the model store 206. In one embodiment, each invoked plugin 210 renders the data model as database specific schema text using a file that defines the syntax and structure corresponding to that of the database type with which that plugin is associated. For example, such a file may specify supported data types, tuning parameters (e.g., logging parameters, table spaces), constraint syntax, index requirements, etc.

Figure 3:
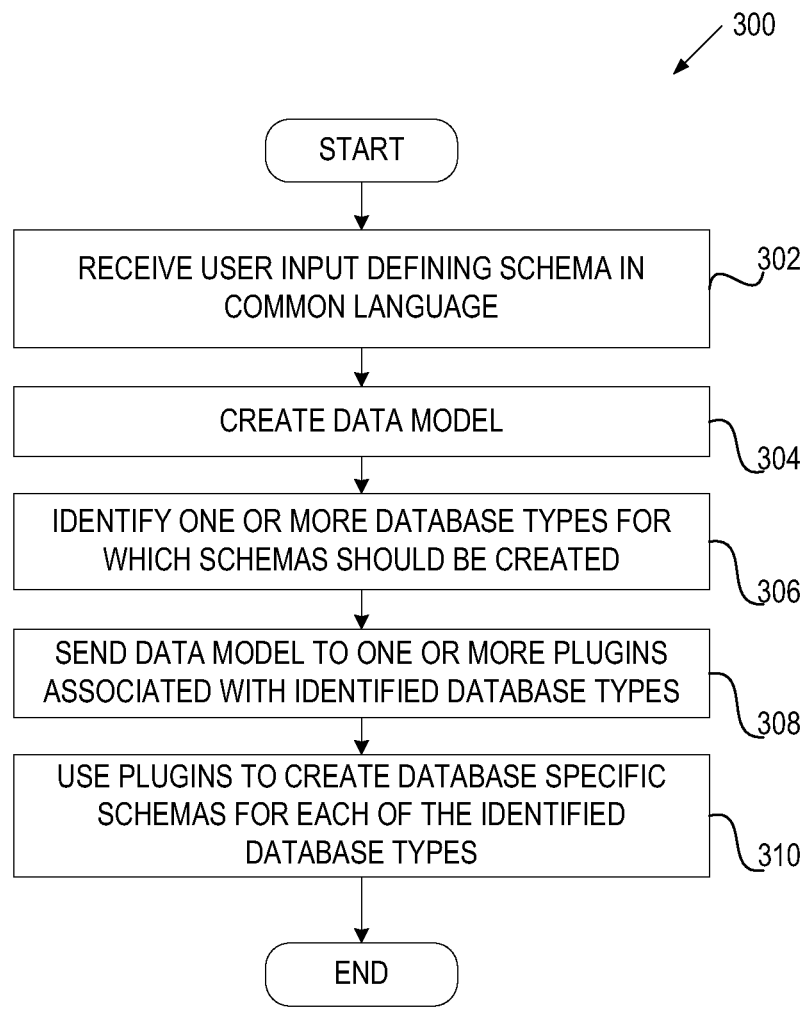
FIG. 3 is a flow diagram of one embodiment of a method for generating database specific schemas.

FIG. 3 is a flow diagram of one embodiment of a method 300 for generating database specific schemas. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by a build system (e.g., build system 102 of FIG. 1).

Referring to FIG. 3, method 300 begins by receiving input (e.g., of a user or another program) defining a schema in a common representation at block 302. In one embodiment, the input identifies one or more text files that define a schema written in a common data dictionary language (ddl).

At step 304, an internal data model of a schema is created based on the user input. In one embodiment, the internal data model may be created by parsing the one or more received schema files written in the common ddl.

At step 306, one or more database types for which schemas are to be created are identified. In one embodiment, the identification is made based on input (of a user or another program) indicating which database types the schema is to be generated for. At step 308, the plugins that are associated with the one or more identified database types are selected, and the internal data model is provided to the selected plugins.

At step 310, plugins are used to create a database specific schema for each of the identified database types. In one embodiment, each selected plugin renders the data model as database specific schema text using the syntax and structure corresponding to that of the database type with which that plugin is associated.

Figure 4:
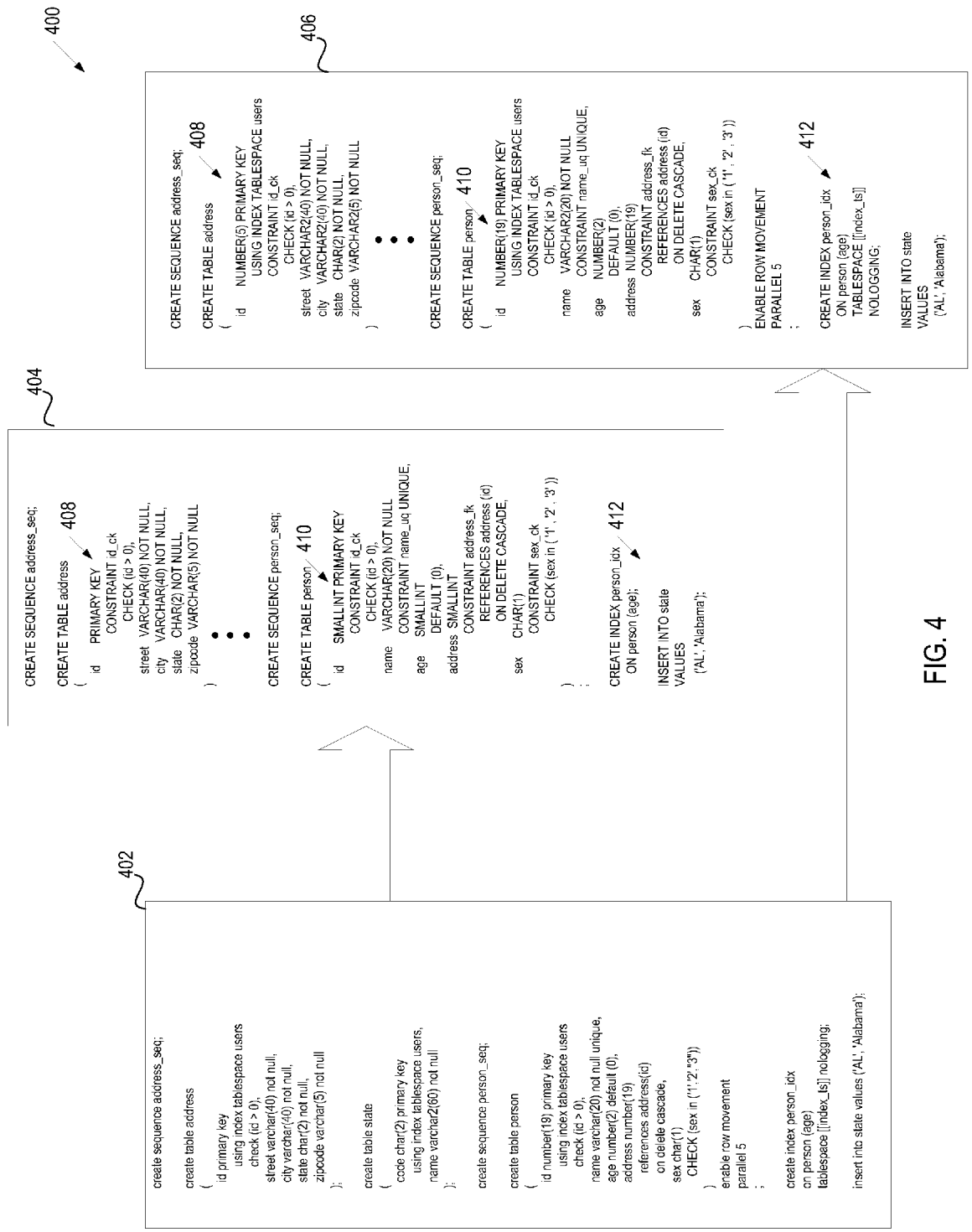
FIG. 4 illustrates exemplary database specific schema text generated according to one embodiment of the present invention.

FIG. 4 illustrates exemplary database specific schema text generated by one embodiment of the present invention. In one embodiment, the database specific schema text is generated by a build system (e.g., build system 102 of FIG. 1).

Received schema text 402 is written in a common data dictionary language and may have been received from a user of a build system. The build system may also have received an input from the user indicating the database types for which a schema is to be created. In the illustrated embodiment, the indicated database types include Oracle® and PostGres.

The received schema text 402 indicates, in part, that multiple tables (e.g., a table called 'address' and a table called 'person') and an index called 'person_idx' are to be created. The received schema text also indicates different requirements for fields in each table.

In one embodiment, an internal data model may be generated from the received schema text 402. Appendix A illustrates an exemplary internal data model generated from received schema text 402 in accordance with one embodiment.

In one embodiment, the internal data model may then be rendered by the appropriate plugins to generate PostGres schema text 404 and Oracle® schema text 406. Both PostGres schema text 404 and Oracle® schema text 406 may be language-specific representations of received schema text 402. While they may describe the same structure, PostGres schema text 404 and Oracle® schema text 406 differ somewhat because of the differences between the PostGres and Oracle® data dictionary languages.

One exemplary difference 408 between the two generated schema texts is evidenced by the representation of the table "address". In the PostGres schema text 404, the 'id' field is defined as a "PRIMARY KEY" with a "CONSTRAINT id_ck." In the Oracle® schema text 406, however, the 'id' field is defined as "NUMBER (5) PRIMARY KEY USING INDEX TABLESPACE users" with a "CONSTRAINT id_ck."

In another exemplary difference 410, the 'id' field in the table 'person' is defined as a "SMALLINT" in the PostGres schema text 404 and as a "NUMBER(19)" in the Oracle® schema text 406. Furthermore, the 'name' field is defined as "VARCHAR(20)" in PostGres schema text 404 and as "VARCHAR2(20)" in Oracle® schema text 406.

In a third exemplary difference 412, the index 'person_idx' specifies tablespacing and nologging parameters in the Oracle® schema text 406, but no such parameters are specified in the PostGres text 404.

Figure 5:
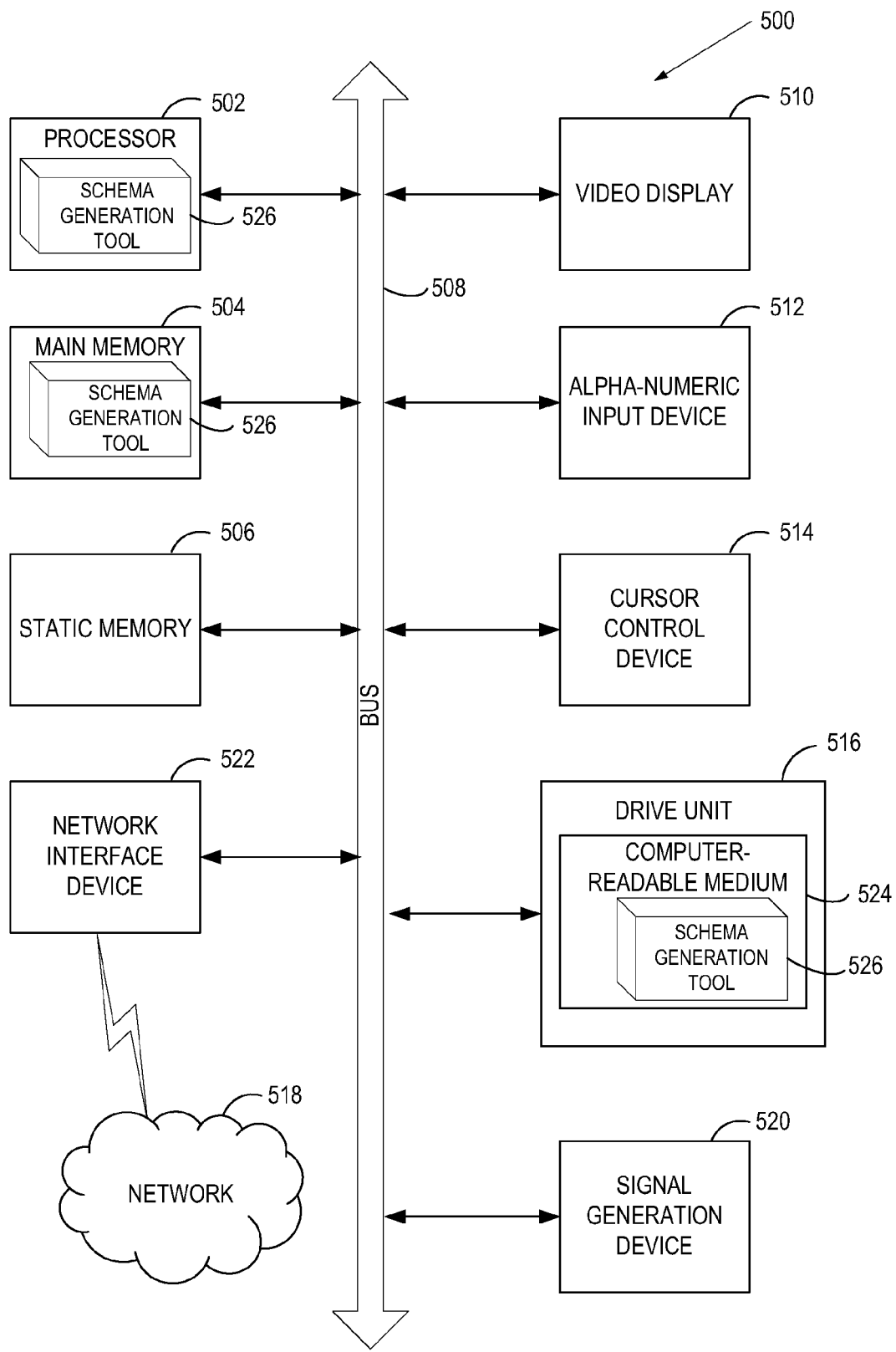
FIG. 5 is a block diagram of one embodiment of a build system.

FIG. 5 is a block diagram of one embodiment of a build system computer system 500. Within the computer system 500 is a set of instructions for causing the machine to perform any one or more of the methodologies for generating database specific schemas discussed herein. In alternative embodiments, the machine may be connected (e.g., networked) to other machines in a LAN, an intranet, an extranet, or the Internet. The machine can operate in the capacity of a server machine or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies for generating database specific schemas discussed herein.

The exemplary computer system 500 includes one or more processing devices 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory 516 (e.g., a data storage device in the form of a drive unit, which may include fixed or removable computer-readable storage medium), which communicate with each other via a bus 408.

Processing devices 502 represent one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute instructions of a schema generation tool 526 (such as a schema generation tool 104 of FIG. 1) for performing the operations and steps for generating database specific schemas discussed herein.

The computer system 500 may further include a network interface device 522 (e.g., NIC, Ethernet network card, etc.). The computer system 500 also may include a video display unit 510 (e.g., a liquid crystal display (LCD) or a cathode ray tube (CRT)) connected to the computer system through a graphics port and graphics chipset, an alphanumeric input device 512 (e.g., a keyboard), a cursor control device 514 (e.g., a mouse), and a signal generation device 520 (e.g., a speaker).

The secondary memory 516 may include a machine-readable storage medium (or more specifically a computer-readable storage medium) 524 on which is stored one or more sets of instructions of a schema generation tool 526 (such as a schema generation tool 104 of FIG. 1) embodying any one or more of the methodologies or functions for generating database specific schemas described herein. The schema generation tool 526 (such as a schema generation tool 104 of FIG. 1) may also reside, completely or at least partially, within the main memory 404 and/or within the processing device 502 during execution thereof by the computer system 500, the main memory 504 and the processing device 502 also constituting machine-readable storage media. The instructions of a schema generation tool 526 (such as a schema generation tool 104 of FIG. 1) may further be transmitted or received over a network 518 via the network device 522.

The computer-readable storage medium 524 may also be used to store the instructions of a schema generation tool 526 (such as a schema generation tool 104 of FIG. 1) persistently. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies for generating database specific schemas of the present invention. The term "computer-readable storage medium" shall accordingly be taken to include, but not be limited to, solid-state memories, and optical and magnetic media.

The components and other features for generating database specific schemas described herein (for example in relation to FIG. 1) can be implemented as discrete hardware components or integrated in the functionality of hardware components such as ASICS, FPGAs, DSPs or similar devices. In addition, these components can be implemented as firmware or functional circuitry within hardware devices. Further, these components can be implemented in any combination of hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "creating," "identifying," "causing" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations for generating database specific schemas. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for generating database specific schemas has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processor, an input file defining a database schema written in a data dictionary language common to a plurality of different database types;
   creating, by the processor, a data model by parsing the input file;
   identifying a first database type of the plurality of different database types for which a first database specific schema file is to be generated;
   identifying a first plugin of a plurality of plugins, wherein the first plugin is associated with the first database type; and
   generating, by the first plugin, the first database specific schema file for the first database type and the data model.

2. The method of claim 1, wherein the input file comprises a text file created by a user.

3. The method of claim 1, wherein the plurality of database types comprises Oracle® database types and PostGres database types.

4. The method of claim 1, wherein each of the plurality of different database types is associated with a single plugin.

5. The method of claim 4, wherein causing the first database specific schema file to be generated comprises:
   rendering, by the first plugin, the data model as a first database specific schema text.

6. The method of claim 4, further comprising:
   adding a second plugin associated with a second database type different from those in the plurality of different database types; and
   allowing a second database specific schema to be generated for the second database type by the second plugin.

7. The method of claim 1, wherein the plurality of different database types comprises a plurality of different database products.

8. The method of claim 1, wherein the plurality of different database types comprises different versions of a same database product.

9. A non-transitory computer readable storage medium comprising instructions that, when executed by a processor, cause the processor to:
   receive, by the processor, an input file defining a database schema written in a data dictionary language common to a plurality of different database types;
   create, by the processor, a data model by parsing the input file;
   identify a first database type of the plurality of different database types for which a first database specific schema file is to be generated;
   identify a first plugin of a plurality of plugins, wherein the first plugin is associated with the first database type; and
   generate, by the first plugin, the first database specific schema file for the first database type and the data model.

10. The non-transitory computer readable storage medium of claim 9, wherein the input file comprises a text file created by a user.

11. The non-transitory computer readable storage medium of claim 9, wherein each of the plurality of different database types is associated with a single plugin.

12. The non-transitory computer readable storage medium of claim 11, wherein to generate the first database specific schema file comprises:
    rendering, by the first plugin, the data model as a first database specific schema text.

13. The non-transitory computer readable storage medium of claim 11, the processor to execute instructions to:
    add a second plugin associated with a second database type different from those in the plurality of different database types; and
    allow a second database specific schema to be generated for the second database type by the second plugin.

14. A system comprising:
    a memory to store instructions; and
    a processor coupled to the memory, the processor executes the instructions to:
    receive an input file defining a database schema written in a data dictionary language common to a plurality of different database types;
    create a data model in view of the input file;
    identify a first database type of the plurality of different database types for which a first database specific schema file is to be generated;
    identify a first plugin of a plurality of plugins, wherein the first plugin is associated with the first database type; and
    generate, by the first plugin, the first database specific schema file for the first database type and the data model.

15. The system of claim 14, wherein the input file comprises a text file created by a user.

16. The system of claim 14, wherein each of the plurality of different database types is associated with a single plugin.

17. The system of claim 16, wherein the processor causes the first database specific schema file to be generated by:
    rendering, by the first plugin, the data model as a first database specific schema text.

18. The system of claim 16, the processor to execute instructions to:
    add a second plugin associated with a second database type different from those in the plurality of different database types; and
    allow a second database specific schema to be generated for the second database type by the second plugin.

* * * * *